US006254212B1

(12) United States Patent
Coudray et al.

(10) Patent No.: US 6,254,212 B1
(45) Date of Patent: Jul. 3, 2001

(54) METHOD AND DEVICE FOR DETERMINING THE QUANTITY OF PRODUCT PRESENT IN A RESERVOIR, NOTABLY THAT OF INK PRESENT IN AN IMAGE FORMING DEVICE

(75) Inventors: Pascal Coudray, La Chapelle des Fougeretz; Marie-Hélène Froger, Chateaugiron; Christophe Truffaut, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/860,686

(22) PCT Filed: Jan. 21, 1997

(86) PCT No.: PCT/EP97/00366

§ 371 Date: Jul. 2, 1997

§ 102(e) Date: Jul. 2, 1997

(87) PCT Pub. No.: WO97/27061

PCT Pub. Date: Jul. 31, 1997

(30) Foreign Application Priority Data

Jan. 22, 1996 (FR) ............................................. 96 00662
Dec. 23, 1996 (FR) ............................................. 96 15858

(51) Int. Cl.⁷ ................................................. B41J 2/195
(52) U.S. Cl. ...................................... 347/7; 399/61
(58) Field of Search ........................ 347/6, 7; 73/304 R; 324/603; 399/27, 30, 57, 61, 62

(56) References Cited

U.S. PATENT DOCUMENTS

| 4,133,453 | * | 1/1979 | Ohbora .................................. 399/61 |
| 4,786,846 | | 11/1988 | Uchida .................................. 318/482 |
| 4,788,861 | * | 12/1988 | Lichti ................................... 73/304 R |
| 4,828,461 | | 5/1989 | Laempe ................................ 417/132 |
| 5,115,218 | | 5/1992 | Jean ..................................... 333/252 |
| 5,329,304 | * | 7/1994 | Koizumi et al. .......................... 347/7 |
| 5,447,056 | * | 9/1995 | Foote .................................... 399/57 |
| 5,465,619 | * | 11/1995 | Sotack et al. ........................... 399/61 |
| 5,635,962 | * | 6/1997 | Goldis ................................... 347/7 |

FOREIGN PATENT DOCUMENTS

| 0626568 | 11/1994 | (EP) . |
| 244931 | 7/1980 | (FR) . |
| 57-135317 | 8/1982 | (JP) . |
| 59-142155 | 8/1984 | (JP) . |
| 60-92861 | 5/1985 | (JP) . |
| 63-417650 | 6/1988 | (JP) . |
| 63-304119 | 12/1988 | (JP) . |

* cited by examiner

Primary Examiner—Arthur T. Grimley
Assistant Examiner—Hoan Tran
(74) Attorney, Agent, or Firm—Fitzpatrick, Cella, Harper & Scinto

(57) ABSTRACT

A device determines a quantity of product present in a reservoir, particularly a quantity of ink in the reservoir (112) of an image forming device, such as a printer (10). The device includes an electrode (120) disposed in contact with the product in the reservoir, a circuit (117) for supplying the electrode with an excitation signal (SE) causing an electromagnetic signal radiated by the product, a receiving antenna (116) for sensing the electromagnetic signal, and a circuit (115) for processing the electromagnetic signal sensed into a signal representing the quantity of product present in the reservoir.

29 Claims, 14 Drawing Sheets

METHOD AND DEVICE FOR DETERMINING THE QUANTITY OF PRODUCT PRESENT IN A RESERVOIR, NOTABLY THAT OF INK PRESENT IN AN IMAGE FORMING DEVICE

The present invention concerns, in general terms, a method and device for determining the quantity of product present in a reservoir, and more particularly for determining the quantity of ink present in the reservoir of an image forming device.

For image forming devices, such as printers, which use ink-jet technology, numerous devices and methods have been designed to determine the quantity of ink.

A first known type of detection uses the electrical characteristics of ink by measuring the resistance thereof between two electrodes.

The document EP-A-0 370 765 describes a device for detecting the quantity of ink present in a reservoir, comprising two electrodes positioned in the channel connecting an ink ejection head to the ink reservoir and a means of detecting the electrical resistance between the two electrodes. The first electrode is situated close to the ejection head while the second is distant from it. A potential difference is applied between these two electrodes. The resistance of the ink present in the reservoir is measured. The result shows that the resistance measured increases non-linearly when the quantity of ink in the reservoir falls.

The measurement of a resistance between two electrodes does not allow the quantity of ink to be measured precisely. This is because the variation in the resistance of the ink present in the reservoir, as a function of the variation in the quantity of ink, is a complex relationship, having a curve such that it approaches an "all or nothing" relationship.

A second known type of detection uses the electrical characteristics of the ink by measuring the capacitance thereof.

The document U.S. Pat. No. 4,700,754 describes detection of the level of liquid ink in a flexible reservoir which retracts as the level of ink falls. The bottom external wall is coated with a conductive layer forming an electrode of a capacitor. The wall of the reservoir serves as a dielectric for the capacitor thus produced while the surface of ink in contact with the bottom wall constitutes the second face of the capacitor. A measurement electrode positioned at the centre of the reservoir connects the ink to a measuring device. When the level of ink falls, the ink surface opposite the conductive layer coated on the wall falls, and so the value of the equivalent capacitance also falls. The fact that the reservoir is flexible enables the measurement electrode to remain in contact with the ink.

This second type of detection is used for a cartridge with flexible walls and cannot be applied to rigid cartridges. This is because the contact between the measurement circuit and the ink can be produced only if the top wall, when it is crushed, forces the measurement electrode to make contact with the ink.

Moreover, this measurement of the level of ink is possible only for liquid ink contained in a reservoir without a porous body.

In addition, it is difficult to know the level of ink if this is below a level between the measurement electrode and the bottom wall. This is because the measurement electrode is unable to descend to the bottom of the reservoir. The range of measurement is thus limited for the low values.

Moreover, more and more image forming devices have several different coloured ink reservoirs for producing more elaborate pictures.

The reservoirs are for example combined in the same cartridge, or if they are independent, they are situated close to one another for practical reasons of use.

The devices and methods known for determining the quantity of ink in a single reservoir cannot easily be adapted to determining the quantity of ink present in a selected one of several reservoirs situated close to one another.

Thus the document U.S. Pat. No. 4,145,927 describes a device for measuring the quantity of liquid present in a reservoir. This method measures the capacitance between two metal plates fixed parallel on the external wall of the reservoir. The two plates are the terminals of a capacitor, the dielectric of which is formed by the wall of the reservoir and the liquid contained in the reservoir.

In order to measure quantities of liquid present in several reservoirs, it is necessary to provide as many pairs of plates as there are reservoirs, which complicates the implementation and increases the cost thereof.

Also, if the liquid is accidentally connected to earth, for example by means of parasitic connections, the device no longer operates and no longer gives a measurement of the quantity of liquid present in the reservoir.

Moreover, the document U.S. Pat. No. 5,315,872 discloses a device for measuring the quantity of liquid present in a reservoir, the walls of which are composed of conductive particles. An electrically isolating layer is disposed on the internal surface of the reservoir and the liquid is connected to earth. The capacitance between the conductive walls of the reservoir and earth is measured. The variation in capacitance is due to the variation in the quantity of liquid present in the reservoir.

This device is not suited to measuring the quantity of liquid in several reservoirs situated close to one another, or several compartments of one reservoir.

This is because, under these conditions, it is difficult to dissociate the measurements made in each of the reservoirs, that is to say to measure the quantity of liquid present in one reservoir, independently of the quantities of liquid present in the other reservoirs.

Also, for reasons of cost and ease of implementation, it is not desirable to have as many measuring devices as reservoirs.

A first object of the present invention is to overcome the drawbacks of the prior art by providing a device and method for determining the quantity of product present in a reservoir which gives, with a satisfactory degree of reliability, the quantity of product in the largest range of measurement, while being simple and economical to implement.

A second object of the present invention is to measure the quantity of product present in a selected one of several reservoirs situated close to one another. The device and method according to the invention give, with a satisfactory degree of reliability, the quantity of product in the selected reservoir, while being simple and economical in design and implementation.

In the course of their research, the inventors observed that an electrical excitation of a product modifies the electrical characteristics of the product, and that this modification depends not only on the excitation signal, but also on the quantity of product. In the light of this, the invention consists of analyzing the effects produced by an electrical excitation of the product.

In a first aspect of the present invention, the electrical excitation of the product leads to electromagnetic radiation therein. The invention then consists of analyzing the radiation produced by an electrical excitation of the product.

To this end, the invention provides a method of determining a quantity of product present in a reservoir, characterised in that it includes the steps of:

applying a predetermined excitation signal to the product present in the reservoir, so that the product radiates an electromagnetic signal, sensing the electromagnetic signal radiated by the product with a sensing means producing an electrical signal representing the electromagnetic signal, and processing the electrical signal to produce a signal representing the quantity of product present in the reservoir.

In a second aspect of the present invention, the electrical excitation of the product leads to the formation of an electric field therein. The invention then consists of analyzing the electric field produced by an electrical excitation of the product.

The invention also enables measurement of the quantity of product present in a selected one of several reservoirs situated close to one another.

The invention then consists in the main of connecting one of the products, the quantity of which it is wished to measure, to a predetermined potential, and then establishing an electric field across the reservoirs and measuring this electric field.

During their work, the inventors observed that the electric field is a function of the quantity of product connected to the predetermined potential, while being substantially independent of the other quantities of product which are not connected to the predetermined potential.

The electrical signal resulting from measurement of the electric field is then analyzed to determine the quantity of product connected to the predetermined potential.

To that end, the invention proposes a method for determining a quantity of a selected product present in one of several reservoirs situated close to one another, characterised in that it includes the steps of:

establishing an electric field across the products present in the reservoirs, setting the selected product to a predetermined potential, and sensing the electric field passing through the products with a sensing means, in order to produce an electrical signal representing the electric field.

The implementation of the invention is simple and reliable. In particular, the electrical signal represents the quantity of selected product, and one characteristic of the invention consists of processing the electrical signal in order to produce a signal representing the quantity of selected product.

In general terms, the invention applies to any product, notably a consumable product used in a given device.

Preferably, the invention applies to ink contained in the reservoir of an image forming device. The image forming device forms the image by using the products as recording material. "Ink" here means any product in liquid, solid, gaseous or powder form designed to modify an optical or physical factor of the printing medium.

The method according to the invention not only has the advantage of resolving the technical problem described above, but also has the advantage of being adaptable to a large number of existing devices.

According to a first embodiment, which is simple and economical to use, the processing step includes the steps of:

detecting the amplitude of the electrical signal, and producing the signal representing the quantity of product from a value given by a calibration table according to the amplitude detected.

According to a second embodiment, which is less sensitive to any external disturbances than the previous one, the processing step includes the steps of:

detecting a phase difference between the electrical signal and the excitation signal, and producing the signal representing the quantity of product from a value given by a calibration table according to the phase difference detected.

Advantageously, the method also includes the step of displaying a representation of the quantity of product, or the step of transmitting the signal representing the quantity of product to a remote device, so that it displays a representation of the quantity of product present in the reservoir.

Since this product is a consumable product used in a given device, the user knows at all times the quantity of product remaining in the reservoir and is thus able, for example, to decide to refill the reservoir before it is completely empty, or to replace the empty reservoir with a full reservoir, or indeed to replace the cartridge comprising the reservoir in the case of an ink cartridge.

The invention also concerns a device for determining a quantity of product present in a reservoir, characterised in that it includes:

a means for exciting the product present in the reservoir by means of a predetermined excitation signal, so that the product radiates an electromagnetic signal, a means for sensing the electromagnetic signal and producing an electrical signal representing the electromagnetic signal, and a means for processing the electrical signal and producing a signal representing the quantity of product present in the reservoir.

The device according to the invention is particularly suited to implementing the above method. The device according to the invention has advantages similar to those of the method disclosed above.

According to a first preferred characteristic, which is easy to implement, the excitation means is an electrode disposed in contact with the product in the reservoir, and the means for sensing the electromagnetic signal is a metal component forming an antenna, such as a metal ribbon, disposed outside the reservoir.

According to a second preferred characteristic, the excitation means is a metal component forming an antenna, such as a metal ribbon, disposed outside the reservoir, and the means of sensing the electromagnetic signal is an electrode disposed in contact with the product in the reservoir.

Advantageously, the excitation means and the means for sensing the electromagnetic signal are so positioned with respect to each other that the product is situated between them. The detection conditions are thus optimized.

According to preferred characteristics of the invention, the excitation means is fed by an oscillator connected to the excitation means via a switch and the excitation signal is an alternating high-frequency signal, preferably with a frequency above 10 MHz.

The inventors determined that a frequency above 10 MHz optimizes the determination of the quantity of product.

According to a first embodiment, which is simple and economical to implement, the processing means includes an envelope detector and an analogue to digital converter for producing a digital signal representing the amplitude of the electrical signal.

According to a second embodiment, less sensitive to any external disturbances than the previous one, the processing means includes a phase comparator and an analogue to digital converter for producing a digital signal representing the phase difference between the electrical signal and the excitation signal.

Advantageously, the device also includes a means for displaying a representation of the quantity of product present in the reservoir.

The invention is able to be adapted to determine quantities of product in several reservoirs respectively; according to a first embodiment, the device is then characterised in that it includes:

for each reservoir, a said means for exciting the product present therein by means of a predetermined excitation signal, so that the product radiates an electromagnetic signal, a common means for sensing the electromagnetic signal and producing an electrical signal representing the electromagnetic signal, and a common means for processing the electrical signal and producing a signal representing the quantity of product present in the reservoir.

According to a second embodiment, the device is characterised in that it comprises:

a common means for exciting the product in each of the reservoirs with a predetermined excitation signal, so that the product radiates an electromagnetic signal, for each reservoir, a said means for sensing the electromagnetic signal and producing an electrical signal representing the electromagnetic signal, and a common means for processing the electrical signal and producing a signal representing the quantity of product present in the reservoir.

The invention also concerns a device for determining a quantity of a selected product present in one of several reservoirs situated close to one another, characterised in that it has:

means for establishing an electric field across the products present in the reservoirs, means for connecting the selected product to a predetermined potential, and means for measuring the electric field passing through the products in order to produce an electrical signal representing the electric field.

According to preferred characteristics, the establishment means have a first metal component disposed outside the reservoirs and the measurement means have a second metal component disposed outside the reservoirs.

The manufacture of the establishment and measurement means, and their installation on the reservoirs, are simple and not very expensive.

Advantageously, the first and second metal components are positioned with respect to one another so that the product is situated between them. The measurement conditions are thus optimized.

According to a preferred characteristic, the means for connecting the product to the predetermined potential have an electrode disposed in contact with the product in the reservoir.

According to preferred characteristics of the invention, the establishment means have an oscillator and the electric field is produced by a high-frequency alternating signal, for example with a frequency substantially equal to 20 MHz.

The inventors determined that a frequency substantially equal to 20 MHz optimizes determination of the quantity of product.

According to a characteristic enabling a simple and economical implementation, the processing means have an envelope detector and an analogue to digital converter for producing a digital signal representing the amplitude of the electrical signal.

The device also has a means for displaying a representation of the quantity of product present in the reservoir.

The invention also provides a reservoir of product, characterised in that it has a single electrode disposed in contact with the product in the reservoir.

The reservoir is advantageously used either to produce an electromagnetic signal radiated by the product, by means of the supplying of the electrode with a predetermined excitation signal, with a view to determining the quantity of product present in the reservoir, or to sense, by means of the electrode, an electromagnetic signal produced by a predetermined excitation signal, with a view to determining the quantity of product present in the reservoir.

The invention also proposes a reservoir of product, characterised in that it has at least one compartment intended to contain a product, an electrode disposed in contact with the product in the reservoir and two metal components one on either side of the said at least one compartment.

The reservoir is advantageously used to connect the product to the predetermined potential, by means of a connection from the electrode to the predetermined potential, and to establish an electric field between the two metal components, by supplying one metal component with a predetermined excitation signal, with a view to determining the quantity of product present in the said at least one compartment of the reservoir.

The reservoir is advantageously the ink reservoir of an image forming device.

The characteristics and advantages of the present invention will emerge more clearly from a reading of several embodiments illustrated by the accompanying drawings, in which:

FIG. 1 is a block diagram of a first embodiment of an image forming device according to the invention, FIG. 2 is a simplified perspective view of part of the image forming device according to the first embodiment of the invention, FIG. 3 is a simplified diagrammatic view of an ink reservoir included in the device in FIG. 1, FIG. 4 is a block diagram of a first embodiment of a conversion circuit according to the first embodiment of the invention, included in the device in FIG. 1, FIG. 5 is an experimental curve showing measurements effected by means of the first embodiment of the invention, FIG. 6 is a block diagram of a second embodiment of the conversion circuit according to the first embodiment of the invention, included in the device in FIG. 1, FIG. 7 is an algorithm for determining the quantity of ink according to the first embodiment of the invention, FIG. 8 is a block diagram of a second embodiment of an image forming device according to the invention, FIG. 9 is a simplified perspective view of part of the image forming device according to the second embodiment of the invention, FIG. 10 is a simplified schematic view of an ink reservoir included in the device in FIG. 8, FIG. 11 is a block diagram of a conversion circuit according to the second embodiment of the invention, included in the device in FIG. 8, FIGS. 12A, 12B and 12C are experimental curves representing measurements made by means of the second embodiment of the invention, FIG. 13 is an equivalent electrical diagram of the ink reservoir included in the device in FIG. 8, and FIG. 14 is an algorithm for determining the quantity of ink according to the second embodiment of the invention.

In the first embodiment chosen and depicted in FIGS. 1 to 7, the invention applies to measurement of the quantity of product in a single reservoir.

Referring more particularly to FIG. 1, the invention applies to an image forming device 10 included generally in an image or data processing device 11. The following description refers more particularly to an ink jet printer, but the image or data processing device 11 can also, for example, be a laser printer, or be included in a facsimile machine, or in a microcomputer. The components other than those of the image forming device 10 are well known to the man skilled in the art and so are neither shown nor described.

The image forming device 10 receives data to be printed Dl through a parallel input output port 107 connected to an interface circuit 106. The circuit 106 is connected to an ink ejection control circuit 110, which controls an ink cartridge 111, via an amplification circuit 114.

The ink cartridge 111 is exchangeable and is mounted on a carriage with reciprocating translational motion, actuated by a motor 102. The ink cartridge 111 includes essentially an ink reservoir 112 and a print head 113.

The printer also has a main data processing circuit 100, associated with a read-only memory 103 and a read-write memory 109. The read-only memory 103 contains the operating programs for the main processing circuit 100, while the read-write memory 109, also associated with the ink ejection control circuit 110, temporarily stores the data Dl received via the interface 106 and the data processed by the main processing circuit 100.

The main processing circuit 100 is connected to a display 104, on which the main processing circuit 100 controls the display of messages showing the functioning of the printer. The main processing circuit 100 is connected to a keypad 105, having at least one switch, by means of which the user can transmit operating commands to the printer.

The main processing circuit 100 is also connected to the motor 102 via an amplification circuit 101. The motor 102 moves the carriage which carries the print cartridge 111. The motor 102 is for example a stepping motor.

The printer described above is conventional and well known to the man skilled in the art. It will not therefore be detailed further.

According to the invention, the ink is excited by a predetermined electrical signal and the effect resulting therefrom, in this case electromagnetic radiation, is analysed to determine the quantity of ink in the reservoir.

Thus, according to the invention, the printer includes in general terms a means 120 for exciting the product present in the reservoir by means of a predetermined excitation signal SE, so that the product radiates an electromagnetic signal, a means 116 for sensing the electromagnetic signal and producing an electrical signal representing the electromagnetic signal, and a means 115 for processing the electrical signal and producing a signal representing the quantity of product present in the reservoir.

The excitation means is an electrode 120 disposed in contact with the ink and the electromagnetic sensor is an antenna 116 situated outside the reservoir. According to a variant disclosed hereinafter, the excitation means can be outside the reservoir and the sensing means within it.

The inventors observed that the electrical characteristics of the sending antenna formed by the ink contained in the reservoir vary according to the quantity of ink.

The alternating excitation signal SE is predetermined, and has a frequency higher than or equal to 10 MHz, for example 18 MHz, provided by an oscillator 117 via a switch 118 and an amplifier 119.

The main processing circuit 100 is connected to the switch 118 in order to control it and thereby permit the transmission of the alternating signal between the oscillator 117 and the electrode 120.

The electromagnetic sensor 116 is a receiving antenna connected to a conversion circuit 115, itself connected to the main processing circuit 100. The electromagnetic sensor 116 detects electromagnetic radiation emitted by the ink forming a sending antenna when it is excited by the excitation signal SE. The electromagnetic sensor 116 converts the electromagnetic signals received into an electrical signal S1. The electromagnetic sensor 116 supplies the electrical signal S1 to the conversion circuit 115, which in response supplies a digital signal SN to the main processing circuit 100.

As a variant, the main processing circuit is replaced by an internal processing circuit of a microcomputer, notably if the image forming device 10 is included in this microcomputer.

Referring to FIG. 2, the printing device conventionally includes a carriage 60 for carrying the print cartridge 111. The carriage is driven in a reciprocating motion on a movement path formed by guide rails 67. The motor 102 drives the carriage 60 by means of a belt device 63. The movement path of the print head 113 is parallel to a line on a printing medium, not shown, such as a sheet of paper. A flexible cable 62 connects the amplification circuit 114 to the ink cartridge 111.

In the preferred embodiment of the invention, the electromagnetic sensor 116 is an elongate metal component such as a ribbon. Its length is adapted to the frequency of the excitation signal SE. For example, for a frequency of 18 MHz, it has been shown experimentally that the length of the electromagnetic sensor 116 is preferably 111 mm. The electromagnetic sensor 116 is bonded to a part of the structure of the printing device or to the carriage 60. As a variant, the electromagnetic sensor is on the reservoir, or within the reservoir.

The electromagnetic sensor detects electromagnetic radiation emitted by the ink cartridge 111, or more precisely by the ink contained in the reservoir 112 when it is excited by the excitation signal SE.

The cable 62 also connects the amplifier 119 to the electrode 120.

Referring to FIG. 3, the ink reservoir 112 has schematically a casing 30 made of a plastic material permeable to electromagnetic radiation. An orifice 32 is provided for the ink outlet. The casing 30 is filled with a porous body impregnated with ink 31. The invention also applies to other types of ink reservoir, notably those which have no porous body. The electrical characteristics of the sending antenna formed by the ink contained in the reservoir vary according to the quantity of ink.

The electrode 120 is situated on an internal face of the casing 30 so as to be in contact with the ink. In the embodiment illustrated in FIG. 3, the electrode 120 is a conductive layer disposed against an internal vertical wall of the casing 30. As a variant, the electrode 120 is a metal plate or is positioned on the bottom of the casing 30.

The electrode 120 transmits the high-frequency excitation signal SE supplied by the oscillator 117 to the ink in the porous body 31.

Preferably, the electrode 120 and receiving antenna 116 are so positioned with respect to each other that, in the course of the measurement detailed hereinafter, the ink contained in the reservoir is situated between the electrode 120 and the receiving antenna 116.

As a variant, the respective functions of the electrode 120 and the receiving antenna 116 are exchanged. The antenna 116 is a sending antenna which receives the excitation signal SE, as depicted in dotted lines in FIG. 1. The ink contained in the reservoir then serves as the receiving antenna. The electrode 120 is a means of sensing the electromagnetic radiation produced by the excitation signal and transmitting the sensed signal to the conversion circuit 115, as depicted in dotted lines in FIG. 1.

The invention also applies to a printer having several ink reservoirs, such as a colour printer. In this case, each of the reservoirs is equipped with a respective electrode 120, which is either a means of exciting, or a means of sensing. In the former case, the printer has a common sensing means, and a common processing means for all the reservoirs. In the second case, the printer has a common excitation means and a common processing means for all the reservoirs. In both cases, sharing part of the means enables an economical production and use of the invention.

According to FIG. 4, the first embodiment of the conversion circuit extracts the amplitude of the radiation emitted by the ink contained in the reservoir 112 in response to the excitation signal SE. The conversion circuit 115 includes an amplifier 50 connected to an envelope detector 51. The envelope detector 51 is connected to an analogue to digital converter 52, one output of which is connected to the processing circuit 100.

The electromagnetic sensor 116 supplies the electrical signal S1 to the amplifier 50, which amplifies the electrical signal S1 in current and voltage so as to facilitate the subsequent processing. The electrical signal S1 is a function of the electromagnetic radiation detected.

The amplifier 50 supplies the amplified signal SA to the envelope detector 51, which determines the amplitude of the amplified signal.

The signal S2 output from the envelope detector 51 is supplied to the converter 52. The converter 52 converts the analogue signal S2 into the digital signal SN in order to transmit it to the processing circuit 100. A calibration or correspondence table TC stored in the memory 103 respectively makes ink quantity values, for example expressed as a percentage of a maximum quantity, correspond to the amplitudes of the digital signal SN supplied by the converter 52.

FIG. 5 is an experimental curve showing the results obtained with the invention. The quantity of ink ENC contained in the reservoir 112, expressed as a percentage of the maximum quantity, is the X-axis and the voltage of the electrical signal S1, expressed in volts, output from the electromagnetic sensor 116 is the Y-axis. The relationship between the variables ENC and S1 is quasi-linear and a given voltage signal S1 indicates, with a high level of reliability, a quantity of ink in the whole ink quantity range.

Referring to FIG. 6, the second conversion circuit embodiment extracts the phase difference between the excitation signal SE and the signal emitted by the ink contained in the reservoir 112 in response to the excitation signal SE. The conversion circuit 115a has, as from a first input, an amplifier 50a connected to a first input of a phase comparator 51a. A second input of the conversion circuit 115a is connected directly to a second input of the phase comparator 51a. The phase comparator 51a is, for example, produced by an exclusive-OR circuit and connected to a low-pass filter 52a in series with an analogue to digital converter 53a, one output of which is an output of the conversion circuit 115a connected to the processing circuit 100.

The electromagnetic sensor 116 supplies the electrical signal S1, which is amplified by the amplifier 50a into the amplified signal SA. The signal SA is supplied to the phase comparator 51a. The phase comparator 51a receives the excitation signal SE at its second input and compares the phases of the signals SA and SE. The result of the comparison is a signal SC supplied to the low-pass filter, which filters it into a filtered signal SF. The signal SC is composed of 1 or 0 depending on the phase equality or difference of the compared signals. The low-pass filter integrates the signal SC. The signal SF is supplied to the analogue to digital converter 53a which digitizes it into a digital signal SNa and delivers the digital signal SNa to the processing circuit 100. The processing circuit uses the signal SNa as the signal SN. A calibration or correspondence table TCa stored in the memory 103 then contains ink quantity values according to phase difference values.

Referring to FIG. 7, an algorithm according to the invention is stored in the read-only memory 103 of the printing device. The algorithm includes seven steps E70 to E76, which are passed through periodically, for example before the printing of a document. The function of the algorithm is to determine the quantity of ink present in the ink reservoir 112.

Step E70 consists of positioning the carriage 60 carrying the ink cartridge 111 at a predetermined position, opposite the electromagnetic sensor 116. As already stated, the relative positions of the electrode 120 and electromagnetic sensor 116 are such that the ink is situated between them.

The algorithm then moves to step E71, during which the switch 118 is activated to enable the passage of the high-frequency signal generated by the oscillator 117 to the amplifier 119. The electrode 120 is supplied with the excitation signal SE. This signal gives rise to the transmission of electromagnetic radiation by the ink contained in the porous body 31.

This radiation is sensed at step E72 by the antenna 116, which supplies the signal S1 to the conversion circuit 115, which in turn supplies the digital signal SN to the processing circuit 100 at step E73. As a variant, the conversion circuit 115a supplies the digital signal SNa to the processing circuit 100.

Step E74 is the determination of the quantity of ink in the reservoir 112. Step E74 consists of finding in the correspondence table TC the stored amplitude value or in the table TCa the stored phase difference value closest to the measured value SN or SNa, and then extracting from the correspondence table TC or TCa the corresponding ink quantity value.

As a variant, the signals SN and SNa are both used to determine with greater precision the quantity of ink present in the ink reservoir 112.

At step E75, a representation of the quantity of ink extracted is displayed for the user on the display 104. The representation of the quantity of ink is displayed either in numerical form or in the form of a diagram.

As a variant, the ink quantity value is transmitted to a remote device, such as a microcomputer, via the input/output port 107. The microcomputer then displays a representation of the quantity of ink for the user, in numerical form or in the form of a diagram.

At step E76, the switch is deactivated so as to open the circuit between the oscillator 118 and electrode 120. The latter is then no longer supplied with the excitation signal SE. The processing circuit 100 then proceeds with the conventional steps in the operation of the printer.

In the case of a printer with several reservoirs, the electrodes of each reservoir are supplied successively or selectively with the excitation signal SE in order to determine the quantity of ink in each reservoir.

According to the second embodiment chosen and depicted in FIGS. 8 to 14, the invention applies to the measurement of the quantity of a product present in a selected one of several reservoirs situated close to one another. In FIG. 8, the invention applies more particularly to an image forming device 10b generally included in an image or data processing device 11b.

The components analogous to those described with reference to FIG. 1 respectively bear the same numeric references, to which the letter "b" is added.

The image forming device 10b receives data to be printed Dl by means of a parallel input/output port 107b connected to an interface circuit 106b. The circuit 106b is connected to an ink ejection control circuit 110b, which controls an ink cartridge 111b, via an amplification circuit 114b.

The ink cartridge 111b is exchangeable and is mounted on a carriage with reciprocating translational motion actuated by a motor 102b. The ink cartridge 111b has essentially an ink reservoir 112b having three ink compartments $112_1$, $112_2$, $112_3$, of different colours, for example yellow, red and blue, respectively, and a print head 113b. The ink compartments are here integrated in the same cartridge, but they may in general be reservoirs which are attached to each other or independent, although juxtaposed, or situated close to one another. The number of compartments, or the number of side-by-side reservoirs, is any number and is for example between two and five.

The printer also has a main data processing circuit 100b, associated with a read-only memory 103b and a read-write memory 109b. The read-only memory 103b contains the operating programs for the main processing circuit 100b, while the read-write memory 109b, also associated with the ink ejection control circuit 110b, temporarily stores the data Dl received via the interface 106b and the data processed by the main processing circuit 100b.

The main processing circuit 100b is connected to a display 104b, on which the main processing circuit 100b controls the display of messages showing the functioning of the printer. The main processing circuit 100b is connected to a keypad 105b, having at least one switch, by means of which the user can transmit operating commands to the printer.

The main processing circuit 100b is also connected to the motor 102b by means of an amplification circuit 101b. The motor 102b moves the carriage which carries the print cartridge 111b. The motor 102b is for example a stepping motor.

The printer described above is conventional and well known to persons skilled in the art. It will not therefore be detailed further.

According to the invention, the ink contained in one of the compartments of the reservoir is selectively connected to a predetermined potential while establishing an electric field across the ink contained in the reservoirs. The electric field is analysed to determine the quantity of ink in the reservoir compartment under consideration.

Thus, according to the invention, the printer has in general three electrodes $120_1$, $120_2$ and $120_3$, respectively disposed in each of the ink compartments $112_1$, $112_2$ and $112_3$. The electrodes $120_1$, $120_2$ and $120_3$ are connected to a selector 123b which connects them selectively to a predetermined potential, which here is earth. The selector 123b is controlled by the main processing circuit 100b.

As a variant, the ink in the compartments is connected to earth in a different manner. For example, the print control circuit is used for this purpose. The print control circuit is conventionally isolated from the ink. According to this variant, the control circuit is connected to the ink via a low-value impedance, that is to say by a capacitance of high value compared to the capacitances existing between the ink and the metal components.

The printer also has means for establishing an electric field across the products present in the reservoir, means for measuring the electric field in order to produce an electrical signal representing the electric field, and means for processing the electrical signal and producing a signal representing the quantity of product present in each of the compartments of the reservoir 112b.

The establishment means have a first metal component 121b fixed on the outside of one of the walls of the ink cartridge 111b. The measurement means have a second metal component 122b fixed to the outside of the cartridge 111b on a wall opposite that of the component 121b. The assembly formed by the components 121b and 122b and the ink contained in the reservoir overall constitutes a capacitor, a more precise equivalent electrical diagram of which will be detailed subsequently The components 121b and 122b constitute the terminals of the capacitor, the dielectric of which is formed by the ink contained in the reservoir.

The inventors observed that the electrical characteristics of the dielectric formed by the ink contained in each compartment of the reservoir vary according to the quantity of ink.

The electric field is produced by a predetermined alternating excitation signal SEb, which has a frequency of the order of 20 MHz. The signal SEb is supplied by an oscillator 117b via a switch 118b and an amplifier 119b.

The main processing signal 100b is connected to the switch 118b in order to control it and thereby permit the transmission of the alternating signal between the oscillator 117b and the component 121b constituting one terminal of the capacitor.

The metal component 122b is connected to a conversion circuit 115b, itself connected to the main processing circuit 100b. The metal component 122b detects the electric field created in the ink when the metal component 121b is excited by the excitation signal SEb. The metal component 122b converts the received electric field into an electrical signal S1b, and supplies the electrical signal S1b to the conversion circuit 115b which in response supplies a digital signal SNb to the main processing circuit 100b.

As a variant, the main processing circuit is replaced by a processing circuit internal to a microcomputer, notably if the image forming device 10b is included in this microcomputer.

With reference to FIG. 9, the printing device conventionally has a carriage 60b for carrying the print cartridge 111b. The carriage is driven in a reciprocating motion on a movement path formed by guide rails 67b. The motor 102b drives the carriage 60b by means of a belt device 63b. The movement path of the print head 113b is parallel to a line on a printing medium, not shown, such as a sheet of paper.

A flexible cable 62b connects the amplification circuit 114b to the ink cartridge 111b. The cable 62b also connects the amplifier 119b to the metal component 121b, the selector 123b to the electrodes $120_1$, $120_2$ and $120_3$, and the metal component 122b to the detection circuit 115b.

With reference to FIG. 10, the ink reservoir 112b has schematically a casing 130b made of a plastic material. The casing 130b has three compartments situated close to one another and which are each filled with a porous body impregnated with ink $131_1$, $131_2$ and $131_3$. The invention also applies to other types of ink reservoir, notably those not having porous bodies.

The three electrodes $120_1$, $120_2$ and $120_3$ are situated on an internal face of the reservoir compartments, in such a way that each of the electrodes is respectively in contact with the ink of one compartment. In the embodiment illustrated by FIG. 10, each of the electrodes $120_1$, $120_2$ and $120_3$ is a pin inserted in a respective compartment. As a variant, the electrodes may be metal plates disposed against the internal walls of the compartments, or the electrodes $120_1$, $120_2$ and $120_3$ may be conductive layers deposited on internal walls of the compartments.

The metal components $121_b$ and $122_b$ are metal plates stuck on two opposite external walls of the ink cartridge, in such a way that the ink compartments are situated between the two metal components 121b and 122b. The metal plates 121b and 122b have dimensions substantially equal to those of the ink compartments.

As a variant, the metal components may be fixed on the carriage, while being situated on either side of the compartments of the reservoir, when the latter is mounted on the carriage.

According to FIG. 11, the conversion circuit 115b extracts the amplitude of the signal received by the metal plate 122b in response to the excitation signal SEb. The conversion circuit 115b includes an amplifier 50b, the input impedance of which is 1 Mohm, to form a high-pass filter, connected to an envelope detector 51b. The envelope detector 51b is connected to an analogue to digital converter 52b, one output of which is connected to the processing circuit 100b.

The metal component 122b supplies the electrical signal S1b to the amplifier 50b which amplifies the electrical signal S1b in current and voltage so as to facilitate the subsequent processing. The electrical signal S1b is a function of the equivalent capacitance existing between the two metal components 121b and 122b at the time of the measurement.

The amplifier 50b supplies the amplified signal SAb to the envelope detector 51b which determines the peak value of the amplified signal.

The signal S2b at the output of the envelope detector 51b is supplied to the converter 52b. The converter 52b converts the analogue signal S2b into the digital signal SNb in order to transmit it to the processing circuit 100b. A calibration or correspondence table TCb stored in the memory 103b respectively makes ink quantity values, for example expressed as a percentage of a maximum quantity, correspond to the amplitudes of the digital signal SNb supplied by the converter 52b.

FIGS. 12A, 12B and 12C are experimental curves showing the results obtained with the invention. In each figure, the quantities of ink ENCb contained in each of the compartments of the reservoir 112b, expressed as a percentage of the maximum quantity, is the X-axis, and the peak value of the voltage of the electrical signal S1b, expressed in volts, at the output of the metal component 122b, is the Y-axis.

For the requirements of the experiment, the three compartments, initially full of ink, of the ink reservoir 112b were successively and progressively emptied, while measurements were regularly made with the device according to the invention.

In FIG. 12A, the curve 50A represents the successive values of the signal S1b measured for different quantities of yellow ink present in the reservoir $112_1$. To make each measurement, the metal component 121b is supplied with the excitation signal SEb and the electrode $120_1$, corresponding to the compartment $112_1$, is connected to earth.

The curve 51A represents other values of the signal S1b, measured for the same quantities of ink present in the reservoir $112_1$, while the electrode $120_2$, corresponding to the red ("Magenta") ink compartment $112_2$, is connected to earth.

Likewise, the curve 52A represents yet other values of the signal S1b, while the electrode $120_3$, corresponding to the blue ("Cyan") ink compartment $112_3$, is connected to earth.

Thus, for each quantity of yellow ink, the metal component 121b is supplied with the excitation signal SEb and the electrodes $120_1$, $120_2$ and $120_3$ are successively connected to earth. The signal sensed by the metal component $122_b$ is measured each time.

In each case, an increase may be observed in the values measured for a compartment as the quantity of ink in the compartment under consideration decreases and the electrode of this compartment is connected to earth. On the other hand, the values measured for the other compartments are substantially constant.

Thus the quantity of ink in a compartment affects the value measured with the device according to the invention when the electrode of the compartment under consideration is connected to earth, but only very slightly influences the value measured when the electrode of another compartment is connected to earth.

Figure 1:
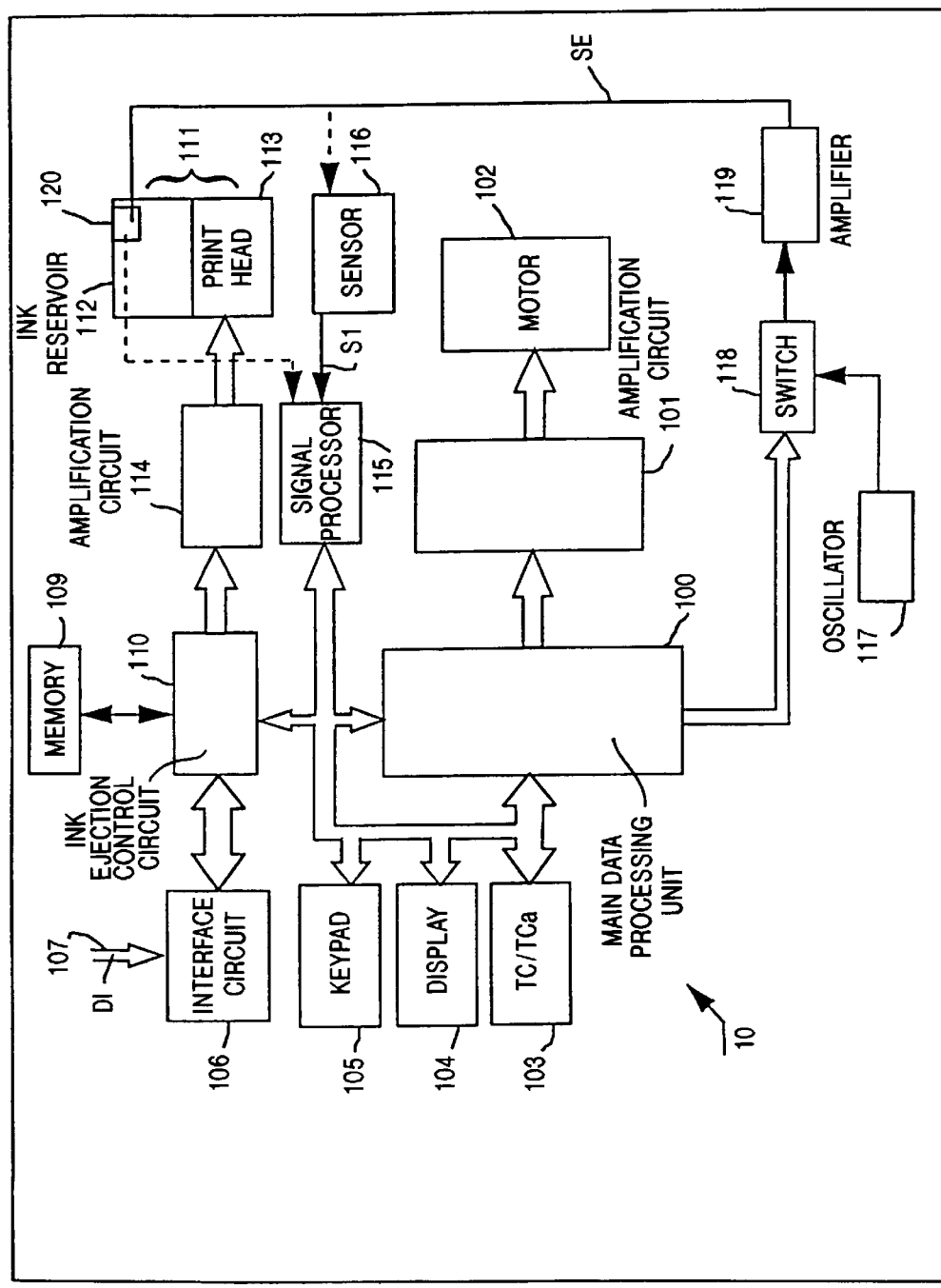
Figure 2:
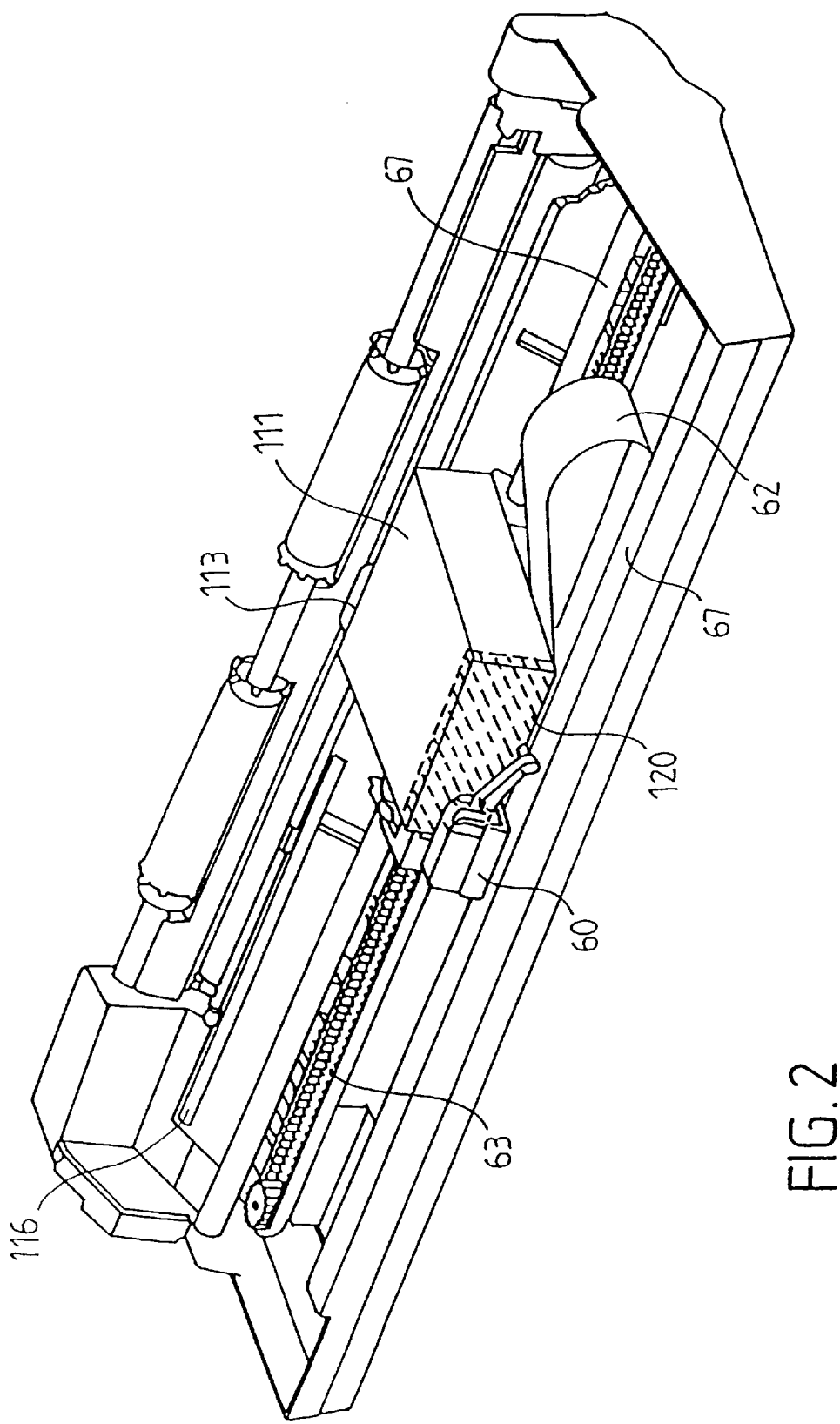
Figure 3:
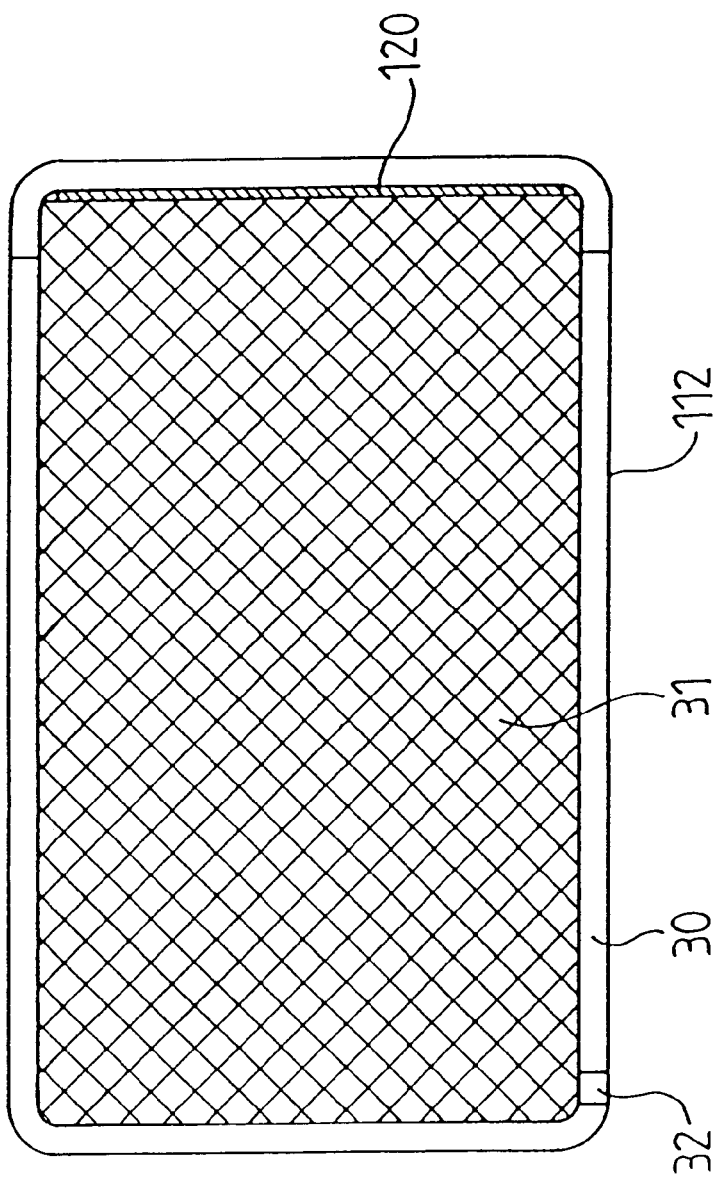
Figure 4:
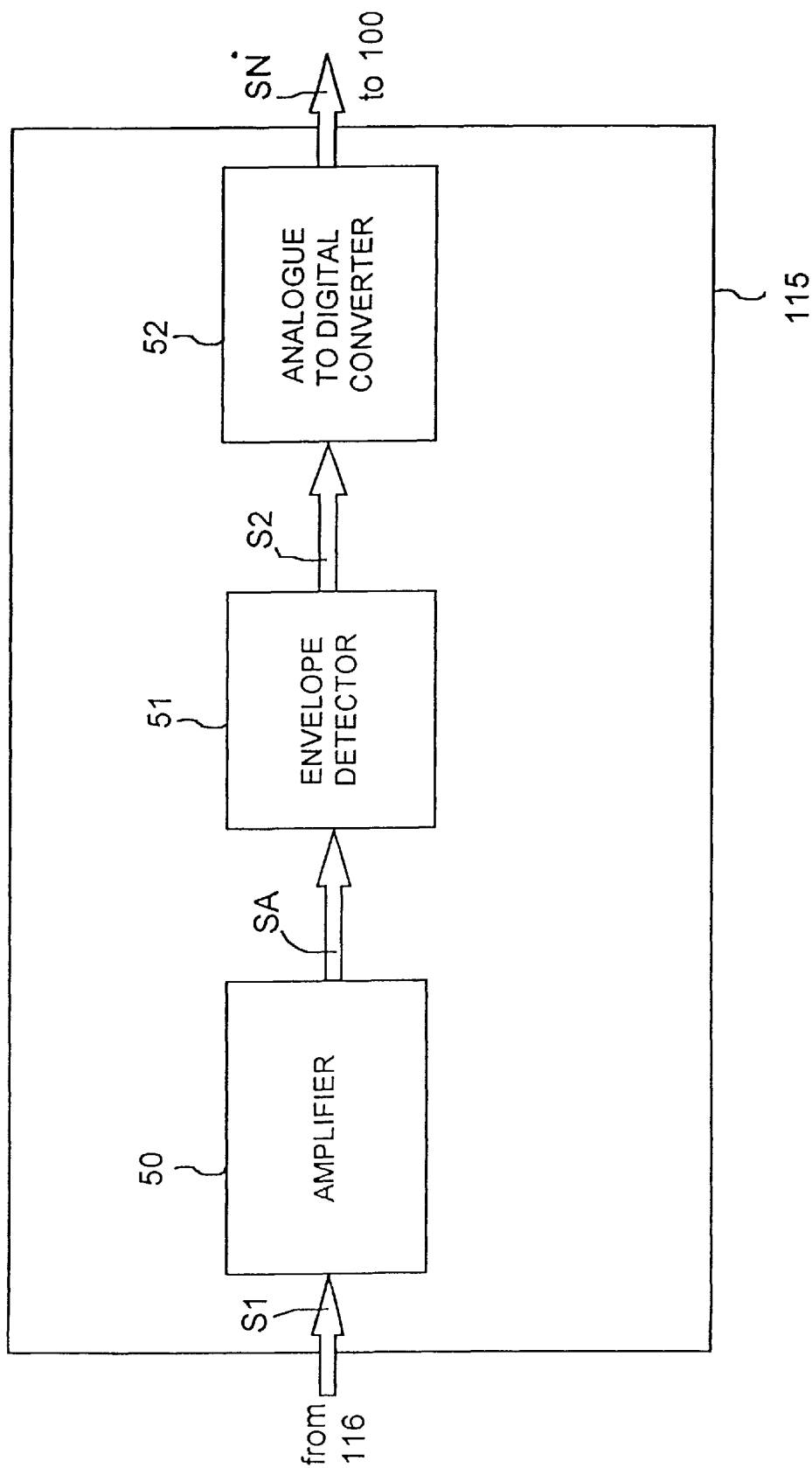
Figure 5:
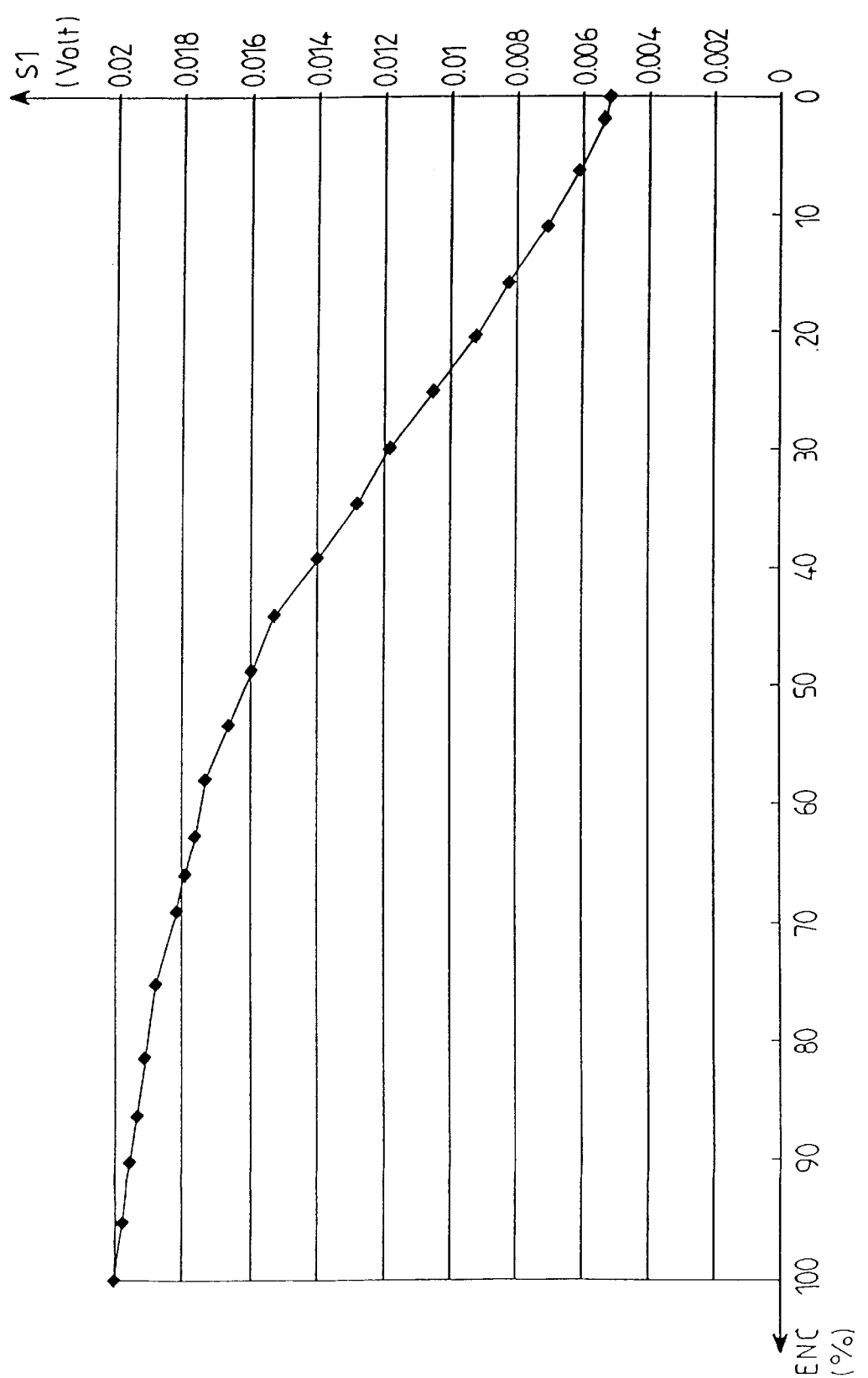
Figure 6:
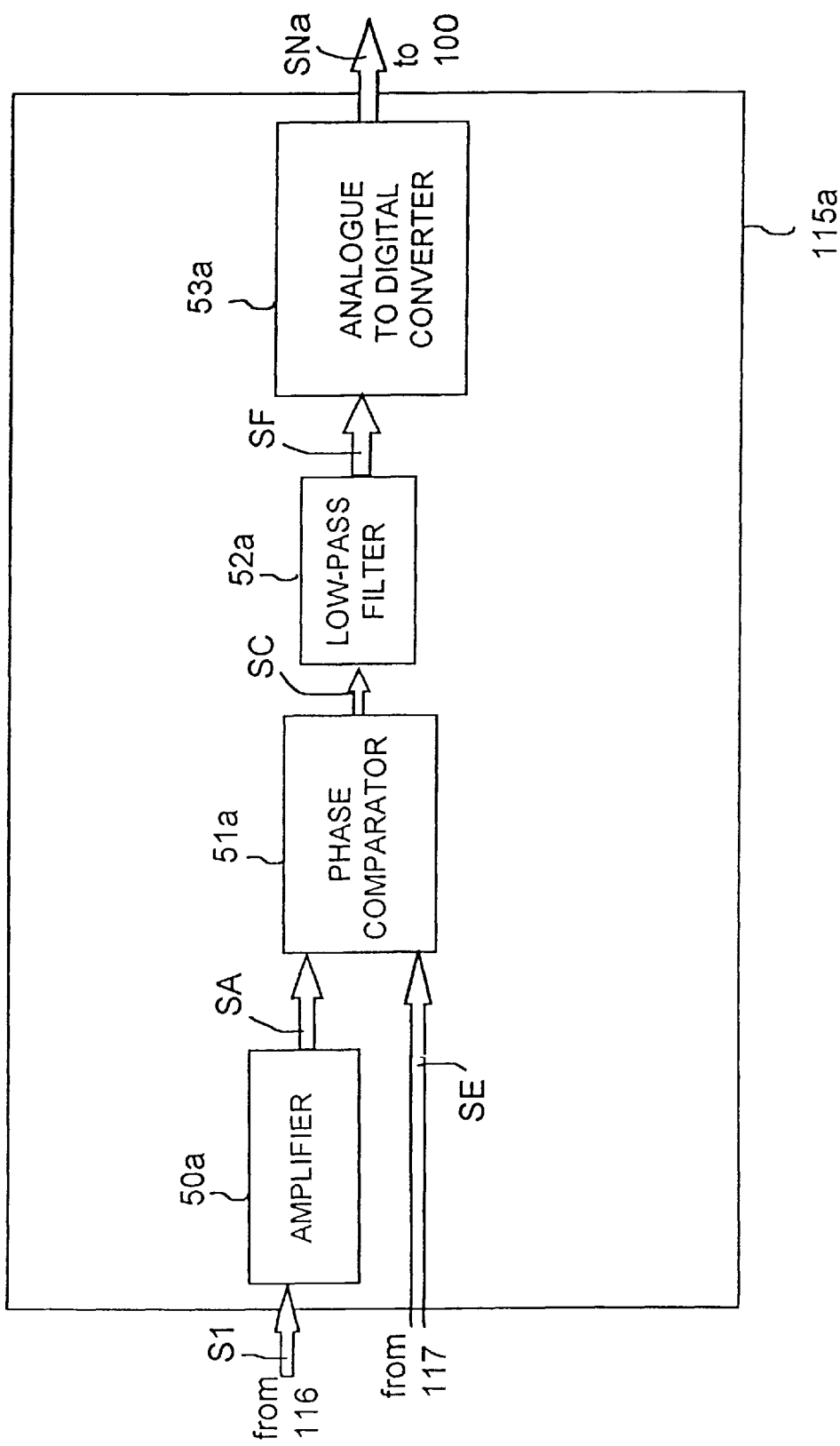
Figure 7:
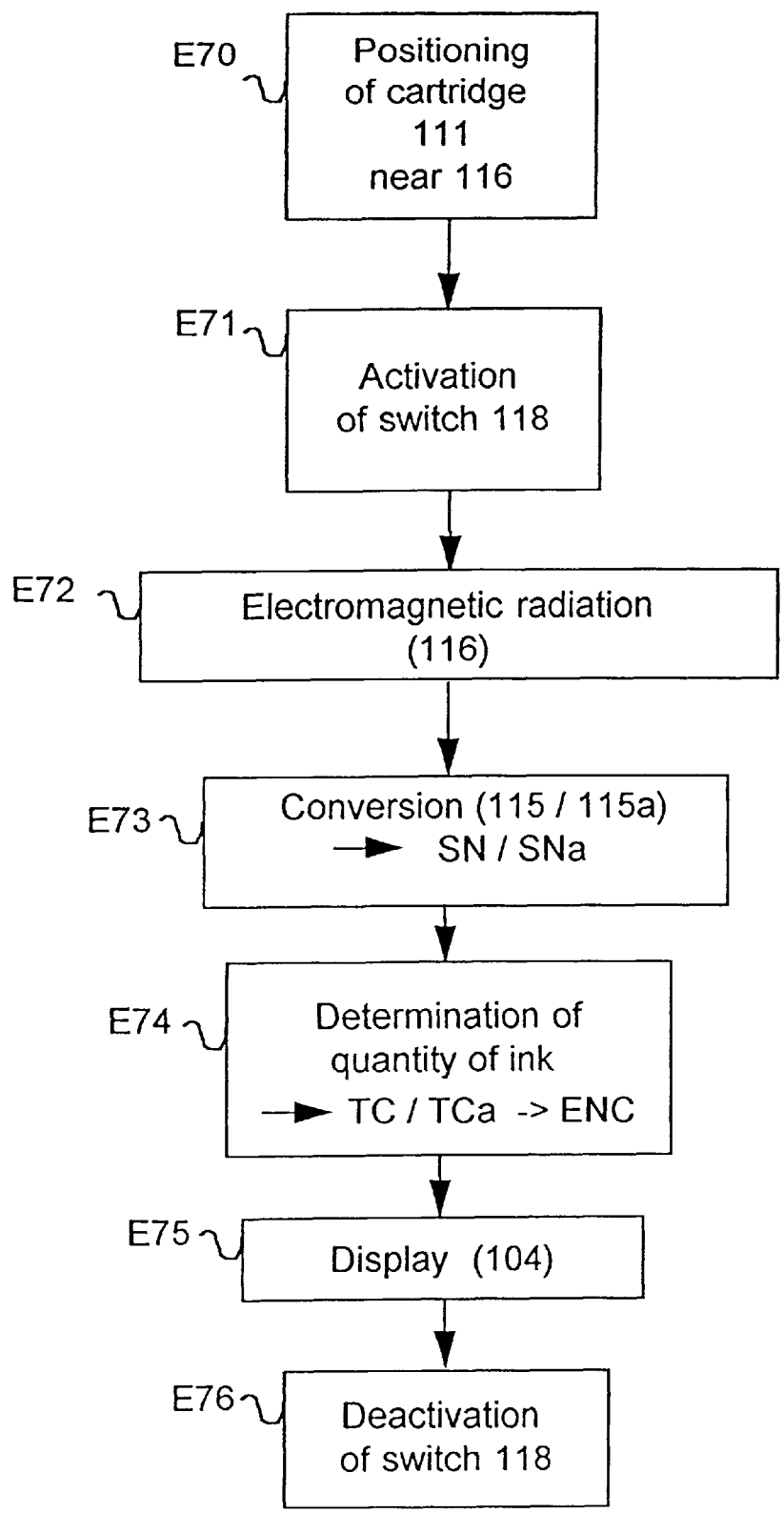
Figure 8:
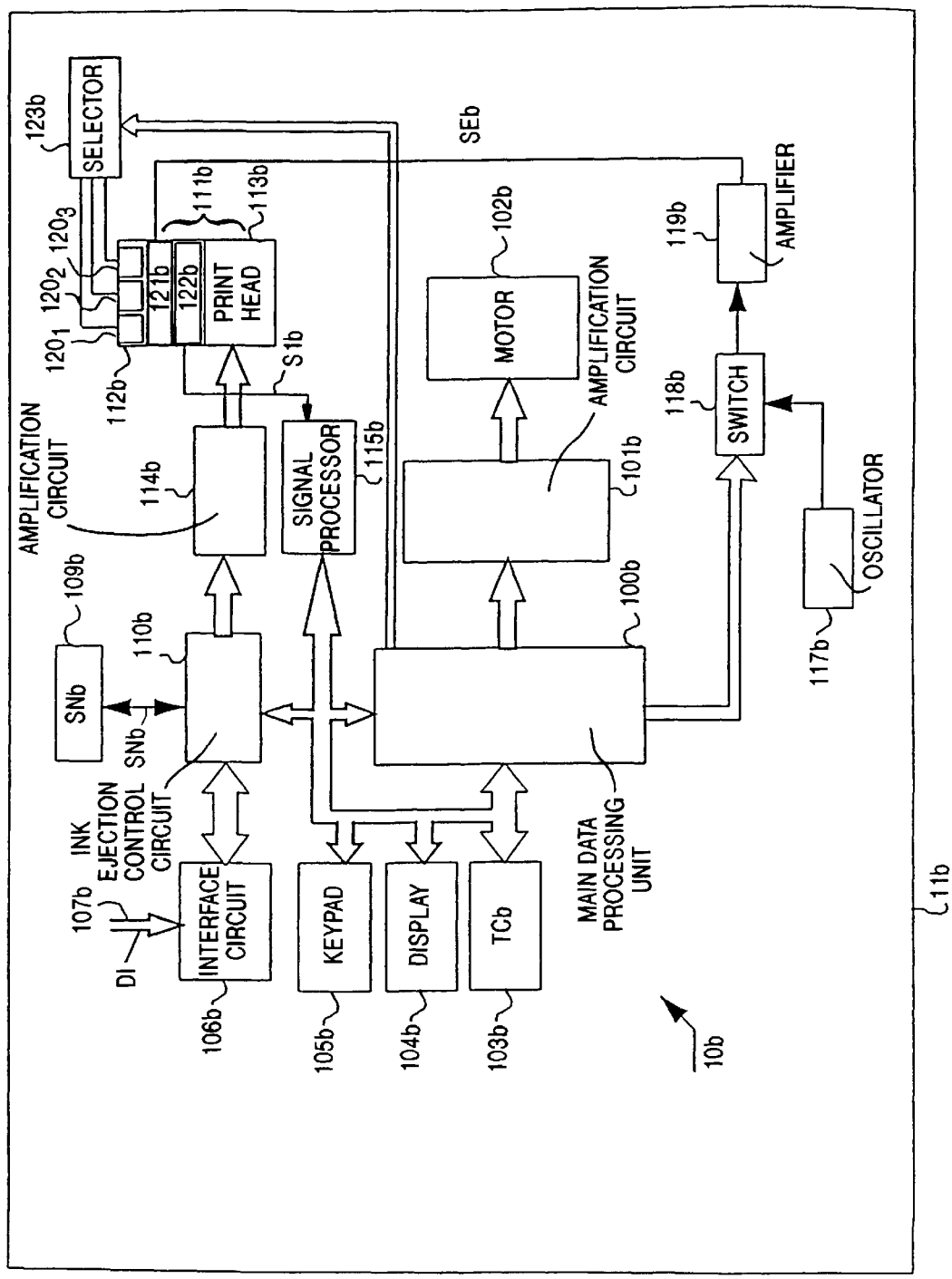
Figure 9:
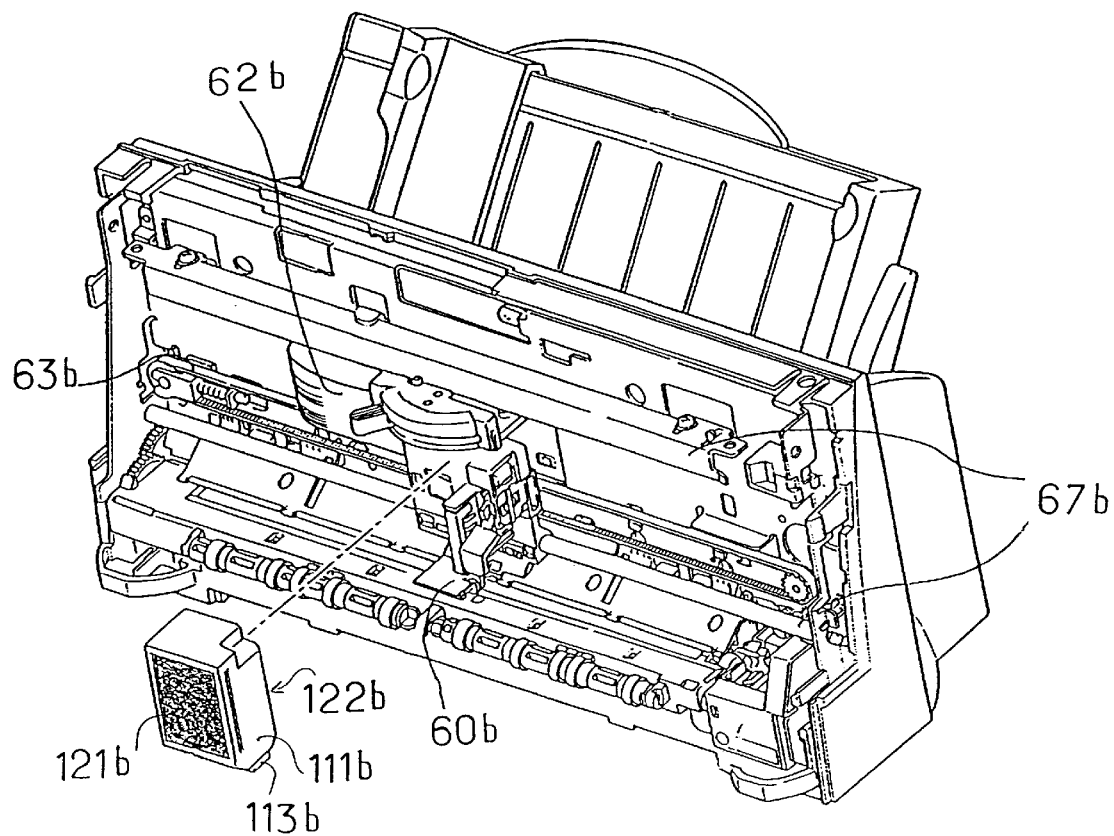
Figure 10:
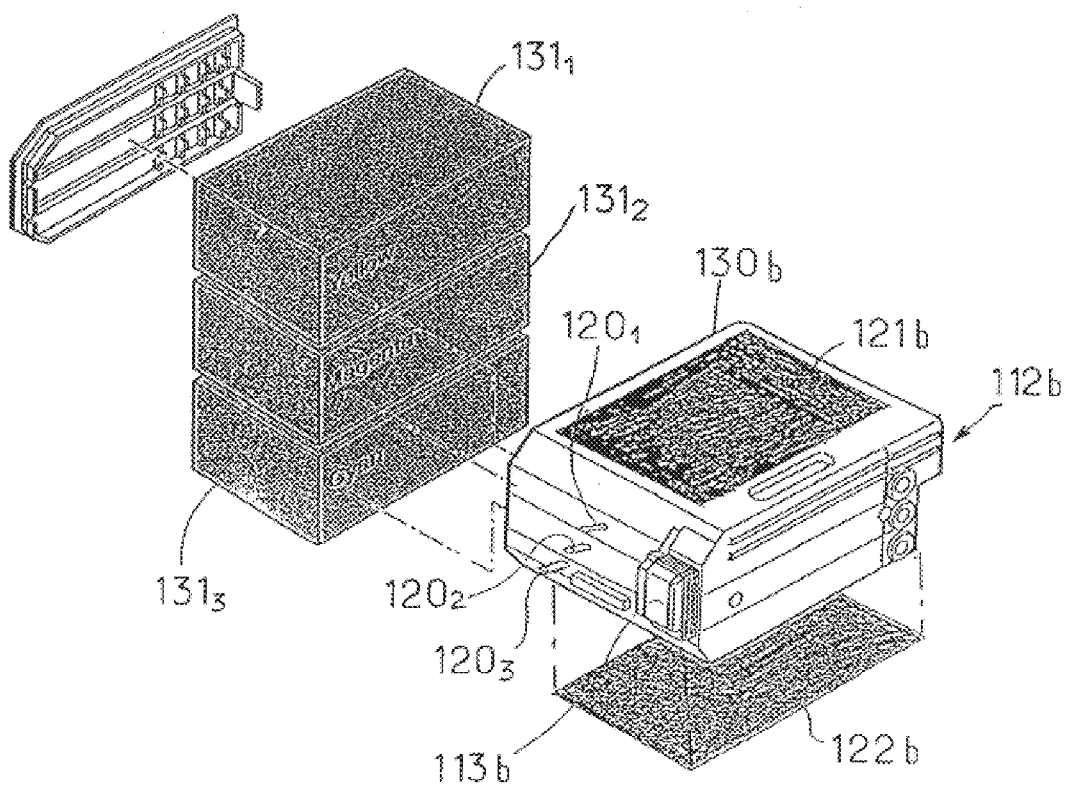
Figure 11:
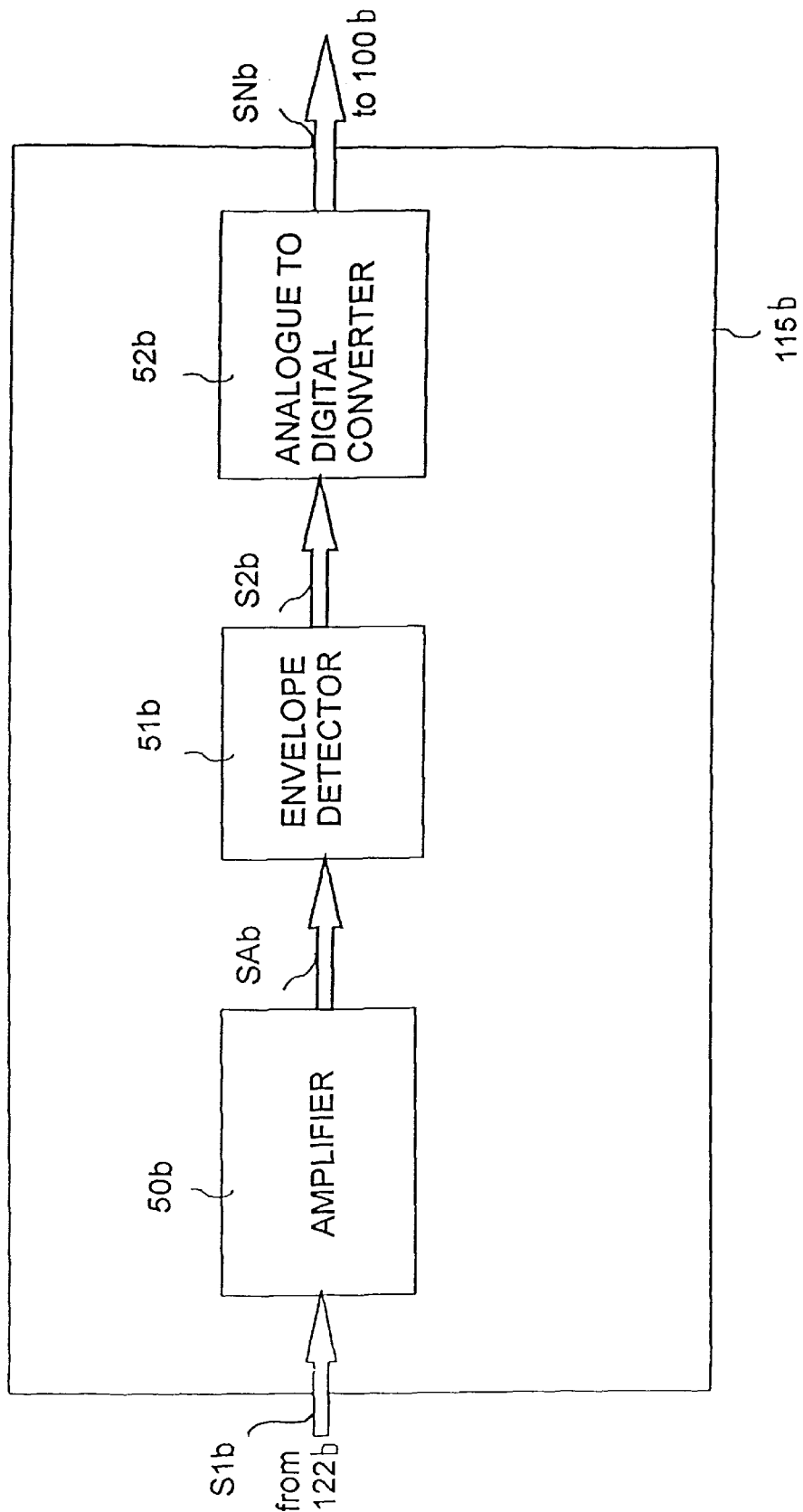
Figures 12A, 12B, 12C:
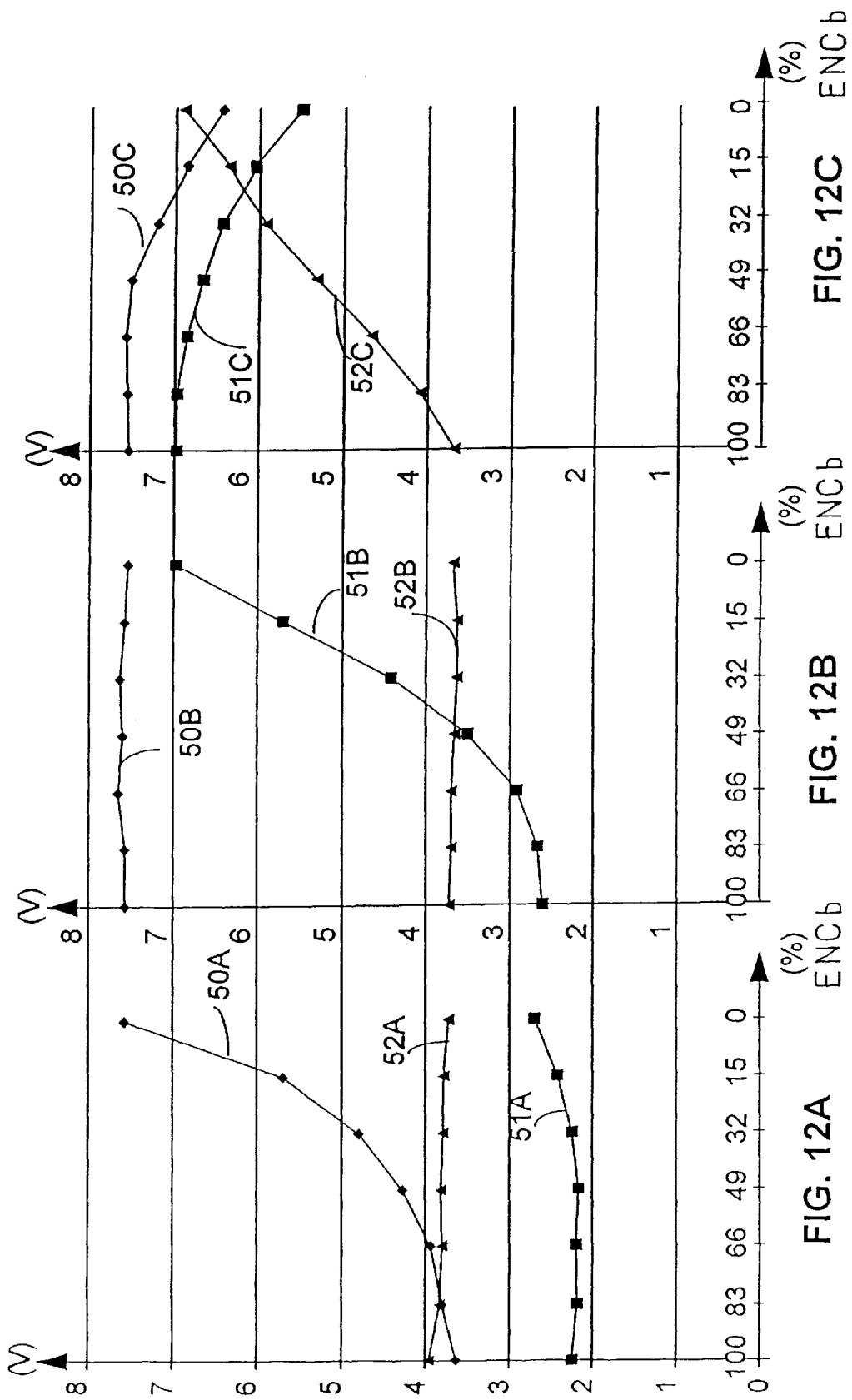
FIG. 12B shows analogous curves 50B, 51B and 52B, corresponding respectively to the ink compartments $112_1$, $112_2$ and $112_3$, while the red ink compartment $112_2$ is progressively emptied.
FIG. 12C shows curves 50C, 51C and 52C, corresponding respectively to the ink compartments $112_1$, $112_2$ and $112_3$, while the blue ink compartment $112_3$ is progressively emptied.
Figure 13:
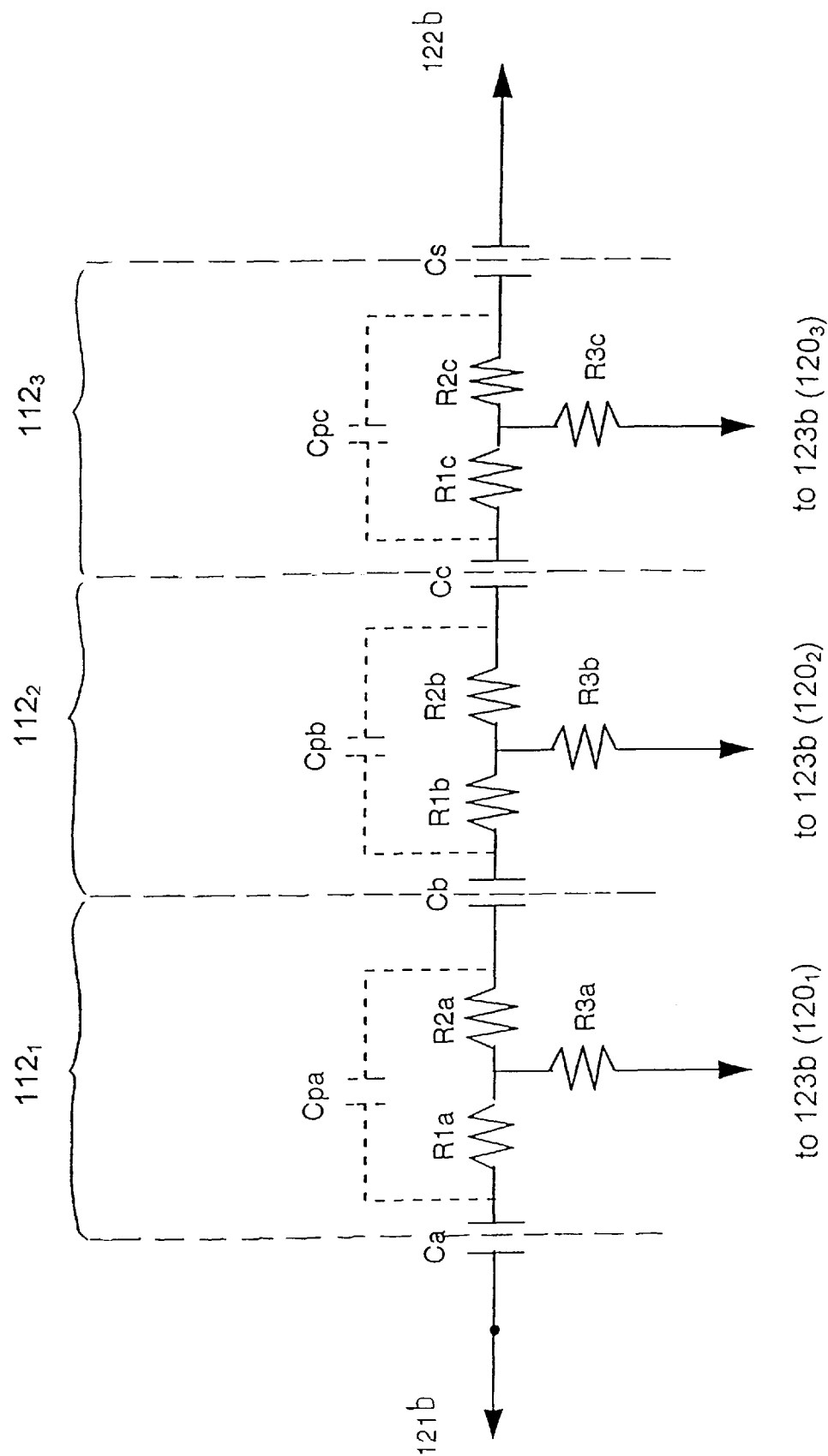

FIG. 13 is an electrical diagram representing the electrical characteristics of the ink reservoir 112b during an ink quantity measurement made according to the invention. The three compartments $112_1$, $112_2$ and $112_3$ have analogous electrical characteristics and are represented by electrical diagrams similar to one another.

From the metal component 121b, the compartment $112_1$ is electrically equivalent to a capacitor Ca, representing the capacitance existing between the metal component 121b, the wall of the cartridge and the ink in the compartment $112_1$, connected in series with two resistors R1a and R2a. The electrode $120_1$ is connected to the mid point of the resistors R1a and R2a, via a resistor R3a and the selector 123b. The resistors R1a, R2a and R3a represent the resistance of the ink and increase when the quantity of ink decreases.

A capacitor Cpa is connected in parallel from the capacitor Ca and the resistors R1a and R2a, and represents a stray capacitance of small value. When the quantity of ink decreases, the value of the capacitance of the capacitor Cpa decreases.

From the resistor R2a, the compartment $112_2$ is electrically analogous to the compartment $112_1$, and has a capacitor Cb in series with two resistors R1b and R2b, at the mid point of which the electrode $120_2$ is connected via a resistor R3b. The capacitor Cb represents the capacitance between the ink in the compartment $112_1$ and that in the compartment $112_2$. A capacitor Cpb is connected in parallel from the capacitor Cb and the resistors R1b and R2b, and represents a stray capacitance of small value.

Finally, the compartment $112_3$ is electrically analogous to the preceding two. From the resistor R2b, the compartment $112_3$ has a capacitor Cc in series with two resistors R1c and R2c, at the mid point of which the electrode $120_3$ is connected via a resistor R3c. The capacitor Cc represents the capacitance between the ink in the compartment $112_2$ and that in the compartment $112_3$. A capacitor Cpc is connected in parallel from the capacitor Cc and the resistors R1c and R2c, and represents a stray capacitance of small value.

Between the resistor R2c and the metal component 122b, an output capacitor Cs represents the capacitance existing between the ink in the compartment $112_3$, the wall of the cartridge and the metal component 122b.

On connecting one of the electrodes $120_1$, $120_2$ or $120_3$ to earth, the ink contained in one of the compartments is connected to earth by means of the resistors, the values of resistance of which increase when the quantity of ink decreases.

Moreover, the values of capacitance of the capacitors Cpa, Cpb and Cpc decrease when the respective quantity of ink decreases.

The voltage measured is therefore the result of the combination of the variations in the resistances corresponding to one of the electrodes connected to earth, and the capacitances Cpa, Cpb and Cpc. Connecting one of the electrodes to earth makes it possible to separate out the effect of the variation in quantity of ink in the compartment under consideration with respect to the other compartments.

Figure 14:
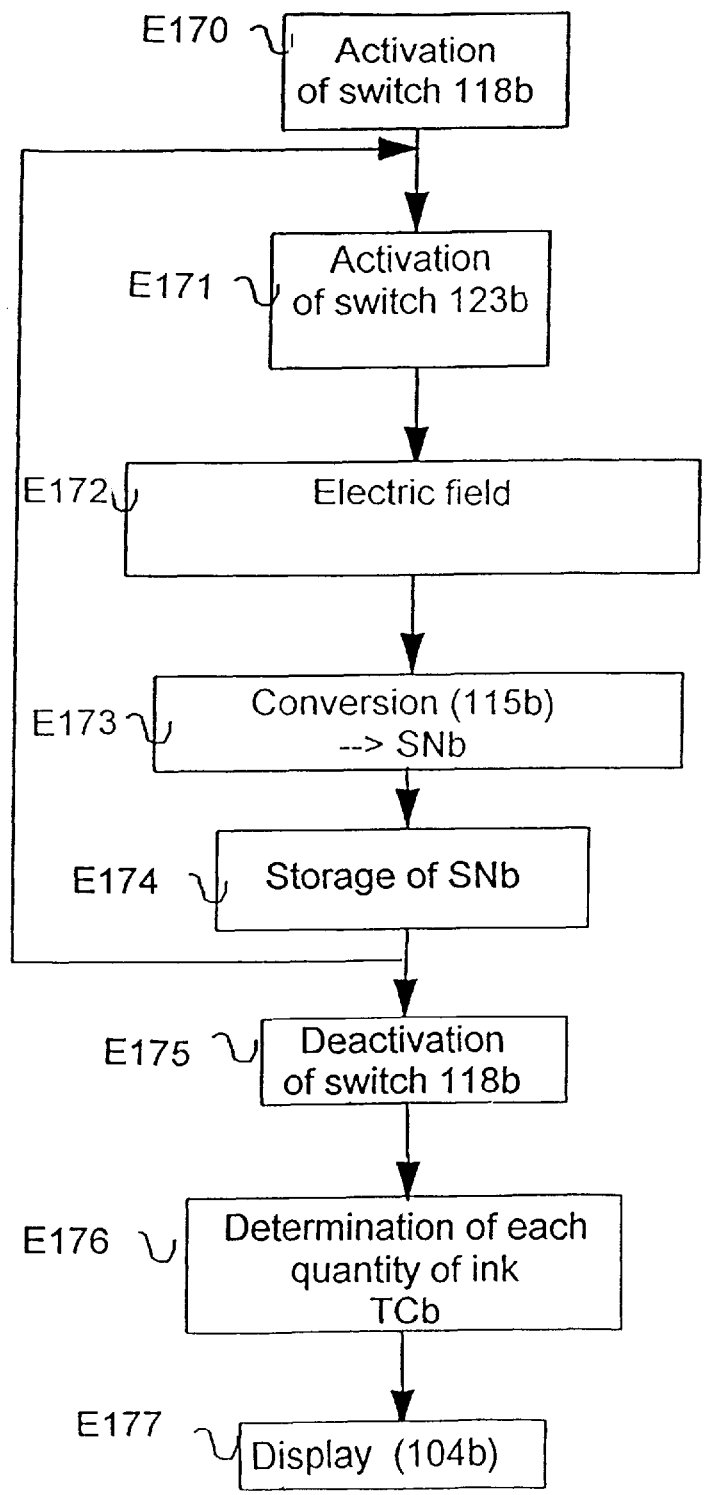

Referring to FIG. 14, an algorithm according to the second embodiment of the invention is stored in the read-only memory 103b of the printing device. The algorithm includes steps E170 to E177 which are passed through periodically for example before printing a document. The function of the algorithm is to determine the quantity of ink present in each compartment of the ink reservoir 112b.

Step E170 consists of activating the switch 118b in order to permit the passage of the high-frequency signal generated by the oscillator 117b to the amplifier 119b. The metal component 121b is supplied with the excitation signal SE.

At the next step E171, the selector 123b is activated in order to select one of the compartments of the reservoir, for which the ink quantity measurement will be made. Activation of the selector causes the connection to earth of one of the electrodes $120_1$, $120_2$ and $120_3$.

The electric field produced in the ink reservoir by the excitation signal SEb is sensed by the metal component 122b at step E172. The metal component 122b supplies the signal S1b to the conversion circuit 115b which in its turn, at step E173, supplies the digital signal SNb to the processing circuit 100b.

Step E174 is the storing of the value of the signal SNb in the memory 109b.

Steps E171 to E174 are passed through successively for each of the compartments of the reservoir 112b, or as a variant only for the selected compartment.

Step E175 is the deactivation of the switch 118b in order to open the circuit between the oscillator 117b and the metal component 121b, so that the signal SEb no longer supplies the metal component 121b. The processing circuit 100b then proceeds with the conventional steps in the operation of the printer.

Step E176 is the determination of the quantity of ink in each compartment of the reservoir 112b. Step E176 consists, for each compartment of the reservoir, of searching in the correspondence table TCb for the stored amplitude value closest to the measured value SNb, and then extracting from the correspondence table TCb the corresponding ink quantity value.

At step E177, a representation of the quantities of ink extracted is displayed on the display 104b for the user. The representation of the ink quantities is displayed either in numerical form, or in the form of a diagram.

As a variant, the ink quantity values are transmitted to a remote device, such as a microcomputer, by means of the input/output port 107b. The microcomputer then displays a representation of the ink quantities for the user, in numerical form or in the form of a diagram.

In the embodiments, the bubble jet recording method in which the bubbles are generated in the ink by the electro-thermal transducer and the ink are flown by the action of the bubbles although the present invention is also applicable to the so-called piezo ink jet recording system in which the ink is flown by an electro-mechanical transducer.

The present invention is particularly useful in an ink jet recording head and a recording apparatus in which an electro-thermal transducer, a laser beam or the like is used to cause a change of state of the ink to eject or discharge the ink, because the high density of pixels and high resolution of recording are attained.

The typical construction and the operational principles are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an ejection outlet to produce at least one droplet. The driving signal is preferably in the form of pulse because the development and the contraction of the bubbles can be effected instantaneously, and therefore the liquid (ink) is ejected with fast response. The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents. In addition, the present invention is applicable to the structure disclosed in Japanese Laid-Open Patent Application No.59-123670 in which a common slit is used as the ejection outlet for a plurality of electro-thermal transducers, and the structure disclosed in Japanese Laid-Open Patent Application No.59-138461 in which an opening for absorbing a pressure wave of thermal energy is formed corresponding to the ejection outlet. This is because the present invention is effective to perform the recording with certainty and high efficiency irrespective of the type of the recording head.

In addition, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provisions of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof. Also, means for effecting preliminary ejection (not for the recording) may stabilize the recording operation.

As regards the variation of the mountable recording head, it may be a single head for a single color or plural heads for a plurality of inks having different colors or densities. The present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable ejection in a conventional recording apparatus of this type, the ink may be such that it is liquid within the temperature range when the recording signal is applied. The present invention is applicable to other types of ink. In one of them, the temperature rise due to the thermal energy is positively prevented by consuming it for the state change of the ink from the solid state to the liquid state. Another ink is solidified when it is is left, to prevent the evaporation of the ink. In any case, the application of the recording signal producing thermal energy, the ink is liquefied, and the lliquefied ink may be ejected. Another ink may start to be solidified at the time when it reaches the recording sheet.

The present invention is also applicable to the ink which is liquefied by the application of the thermal energy. Such ink may be retained in liquid state or solid state in holes or recesses formed in a porous sheet as disclosed in Japanese Laid-Open Patent Application No.54-56847 and Japanese Laid-Open Patent Application No.60-71260. The sheet is faced to the electro-thermal transducers. The most effective one of the inks described above is the film boiling system.

The ink jet recording apparatus may be used as an output terminal of an information processing apparatus such as a computer or the like, as a copying machine combined with an image reader or the like, or as a facsimile machine having information sending and receiving functions.

Naturally, the present invention is in no way limited to the embodiments described and depicted, but on the contrary encompasses any variant within the reach of one skilled in the art.

We claim:

1. A method for determining a quantity of a selected product present in one of several reservoirs situated close to one another, said several reservoirs each containing product, comprising the steps of:

establishing an electric field across the product present in all of the reservoirs, setting the selected product to a predetermined potential, and sensing the electric field passing through the product in all of the reservoirs with a sensing means, in order to produce an electrical signal representing the electric field.

2. A method according to claim 1, further comprising the step of processing the electrical signal in order to produce a signal representing the quantity of the selected product.

3. A method according to claim 2, wherein the processing step comprises the steps of:

detecting the amplitude of the electrical signal, and producing the signal representing the quantity of the selected product from a value given by a calibration table according to the amplitude detected.

4. A method according to claims 1, 2, or 3, further comprising the step of displaying a representation of the quantity of the selected product.

5. A method according to claims 1, 2, or 3, further comprising the step of transmitting the signal representing the quantity of the selected product to a remote device, so that it displays a representation of the quantity of the selected product.

6. A method according to claims 1, 2, or 3, wherein the selected product is ink.

7. A method according to claim 4, wherein the selected product is ink.

8. A method according to claim 5, wherein the selected product is ink.

9. A device for determining a quantity of a selected product present in one of several reservoirs situated close to one another, said several reservoirs each containing product, comprising:

means for establishing an electric field through the product present in all of the reservoirs, means for connecting the selected product to a predetermined potential, and means for measuring the electric field passing through the product in all of the reservoirs in order to produce an electrical signal representing the electric field.

10. A device according to claim 9, further comprising means for processing the electrical signal in order to produce a signal representing the quantity of the selected product.

11. A device according to claim 9, wherein the connection means includes an electrode disposed in each of the several reservoirs, the electrode in each reservoir being in contact with the product in the respective reservoir.

12. A device according to claim 9, wherein the establishment means includes an oscillator.

13. A device according to claim 9, wherein the electric field is produced by a high-frequency alternating signal.

14. A device according to claim 9, wherein the electric field is produced by an alternating signal with a frequency substantially equal to 20 MHz.

15. A device according to claim 9, wherein the measuring means includes an envelope detector and an analogue to digital converter for producing a digital signal representing the amplitude of the electrical signal.

16. A device according to claim 9, further comprising a means for displaying a representation of the quantity of the selected product.

17. A device according to claim 9, wherein the selected product is ink.

18. A device according to claim 9, wherein said device is a device for determining a quantity of product present in an ink reservoir in an image forming device.

19. A device according to claim 18, wherein the image forming device is a printer.

20. A device according to claim 18, wherein the image forming device is a facsimile machine.

21. A device according to claim 18, wherein the image forming device comprises a microcomputer.

22. A device according to claim 9, wherein the establishment means includes a first metal component disposed outside the reservoirs.

23. A device according to claim 10, wherein the establishment means includes a first metal component disposed outside the reservoirs.

24. A device according to claim 22 or 23, wherein the measurement means includes a second metal component disposed outside the reservoirs.

25. A device according to claim 24, wherein the first and second metal components are positioned with respect to one another so that the product is situated between them.

26. A reservoir of product, comprising:

a plurality of compartments intended to contain a product, means for connecting the product in each compartment to a predetermined potential, and two metal components, one on either side of the reservoir, for establishing and measuring an electric field through the product.

27. A reservoir according to claim 26, wherein the reservoir connects the product to a predetermined potential, by means of a connection from the electrode to the predetermined potential, and the reservoir establishes an electric field between the two metal components, through the product, by supplying one metal component with a predetermined excitation signal, with a view to determining the quantity of product present in the said reservoir.

28. A reservoir according to claim 27, wherein the excitation signal has a frequency substantially equal to 20 MHz.

29. A reservoir according to claim 26, wherein said product is ink.

* * * * *

UNITED STATES PATENT AND TRADEMARK OFFICE
CERTIFICATE OF CORRECTION

PATENT NO. : 6,254,212 B1  
DATED : July 3, 2001  
INVENTOR(S) : Pascal Coudray et al.

It is certified that error appears in the above-identified patent and that said Letters Patent is hereby corrected as shown below:

Title page,  
Item [56], References Cited, FOREIGN PATENT DOCUMENTS, "244931" should read -- 2444931 --.

Column 15,  
Line 64, "are" should read -- is --.

Column 17,  
Line 21, "case," should read -- case, with --; and  
Line 23, "lliquefied" should read -- liquefied --.

Signed and Sealed this

Fourth Day of June, 2002

Attest:

JAMES E. ROGAN  
Attesting Officer     *Director of the United States Patent and Trademark Office*